United States Patent [19]

Nelson

[11] Patent Number: 4,545,189
[45] Date of Patent: Oct. 8, 1985

[54] RAKE WITH GRASPING APPARATUS

[76] Inventor: Larry N. Nelson, R.R. #2, Tekamah, Nebr. 68061

[21] Appl. No.: 694,147

[22] Filed: Jan. 23, 1985

[51] Int. Cl.⁴ ............................................. A01D 7/10
[52] U.S. Cl. ................................ 56/400.12; 294/50.9; 294/105
[58] Field of Search .......... 56/400.11, 400.12, 400.17; 294/50.5, 50.6, 50.8, 50.9, 105, 107

[56] References Cited

U.S. PATENT DOCUMENTS

| | | | |
|---|---|---|---|
| 1,055,224 | 3/1913 | Proctor | 56/400.12 |
| 1,160,282 | 11/1915 | Harris et al. | 56/400.12 |
| 1,682,795 | 9/1928 | Morgan | 56/400.11 |
| 1,939,475 | 12/1933 | Walsh | 56/400.12 |
| 2,136,849 | 11/1938 | Hembree | 56/400.12 |
| 2,509,943 | 4/1950 | Zifferer | 56/400.12 |
| 2,746,234 | 5/1956 | Utley | 56/400.12 |
| 2,891,374 | 6/1959 | Richmond | 56/400.12 |
| 3,105,348 | 10/1963 | Vosbokian et al. | 56/400.12 |
| 3,601,966 | 8/1971 | Kerry | 56/400.12 |
| 3,716,263 | 2/1973 | Gatti | 294/50.8 |
| 4,018,038 | 4/1977 | Sipe | 56/400.12 |
| 4,378,671 | 4/1983 | Gascon | 56/400.12 |

Primary Examiner—Robert P. Swiatek
Assistant Examiner—David L. Tarnoff
Attorney, Agent, or Firm—E. Robert Newman

[57] ABSTRACT

An attachment to a conventional rake having a grasping head pivotally attached to a link which is pivotally attached to the rake head such that an operable clamp is formed, the grasping head being operated by a lever attached to the rake's handle. The pivotal link separates the upper portions of the two heads such that the capacity of the "grasp" is greater than that of conventional rakes with grasping apparatus.

20 Claims, 5 Drawing Figures

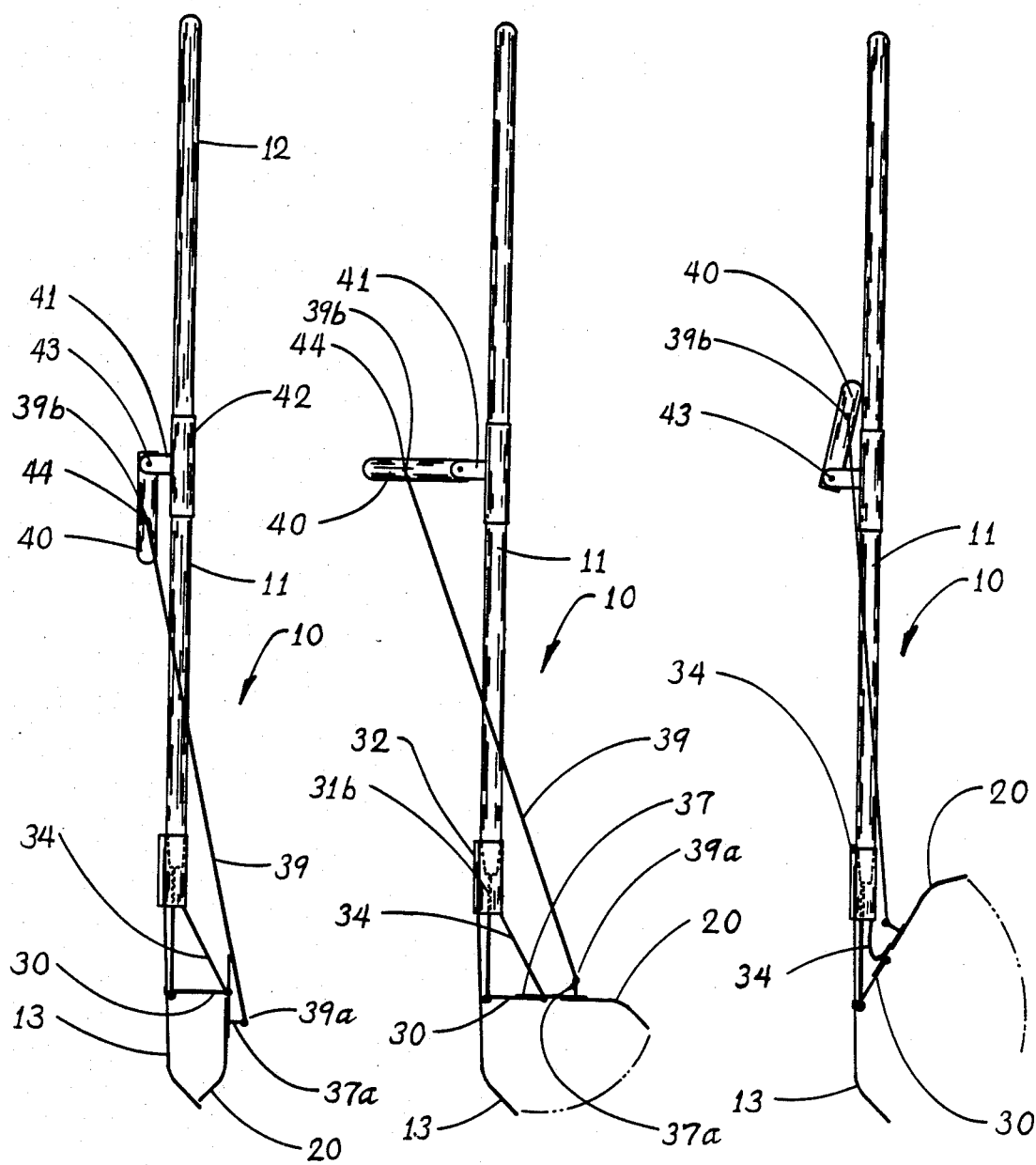

RAKE WITH GRASPING APPARATUS

TECHNICAL FIELD

This invention relates generally to rakes, and more particularly to attachments to rakes which allow the rake to be used to grasp the material being raked.

BACKGROUND ART

Conventional rakes are typically used to sweep leaves or other materials into a pile which is then picked up and placed within bags or other containers for disposal. The task of picking up these piles can be quite burdensome and strain the back of even an athletic person. The elderly and handicapped may well find the task impossible.

To date, there are a wide variety of rakes having apparatus for grasping these piles of materials, thereby lessening or eliminating the need for the user to bend over. These devices suffer three basic problems. First, the capacity of the grasping apparatus is quite small, forcing the user to make frequent trips to dispose of a pile of leaves. Second, each rake with grasping apparatus must be purchased as a complete unit, since the basic rake is modified to add the grasping apparatus. Finally, the grasping head of the grasping apparatus is generally of equal size and weight as the rake head, thus adding a significant amount of weight to the device. This additional weight directly reduces the ease and convenience of using the grasping apparatus.

SUMMARY OF THE INVENTION

It is therefore a general object of the invention to provide an improved rake with grasping apparatus.

Another object is to provide an attachment for grasping material which may be affixed to an existing rake.

A further object of the present invention is to provide a rake with grasping apparatus having large capacity and minimal weight.

More generally, it is an object of the present invention to provide an attachment to a conventional rake which includes a grasping head which is pivotally attached opposing the rake head for grasping material therebetween, the grasping head being operated by a lever attached to the rake's handle. A pivotal link joins the two heads and separates their upper portions during operation, such that the capacity of the "grasp" is larger than conventional rakes with grasping apparatus. The grasping apparatus is designed such that it can be either an integral part of the invention or a separate attachment for easy installation on an existing rake.

These and other objects and novel features of the present invention will become apparent from the following detailed description of the invention when considered in conjunction with the accompanying drawings.

BRIEF DESCRIPTION OF THE DRAWINGS

FIG. 1 is a side elevational view of the device installed upon a conventional rake, the device being in the "closed" position.

FIG. 2 is a side elevational view of the device installed upon a conventional rake, the device being in the "intermediate" position.

FIG. 3 is a side elevational view of the device installed upon a conventional rake, the device being in the "open" position.

BEST MODE FOR CARRYING OUT THE INVENTION

Figure 4:
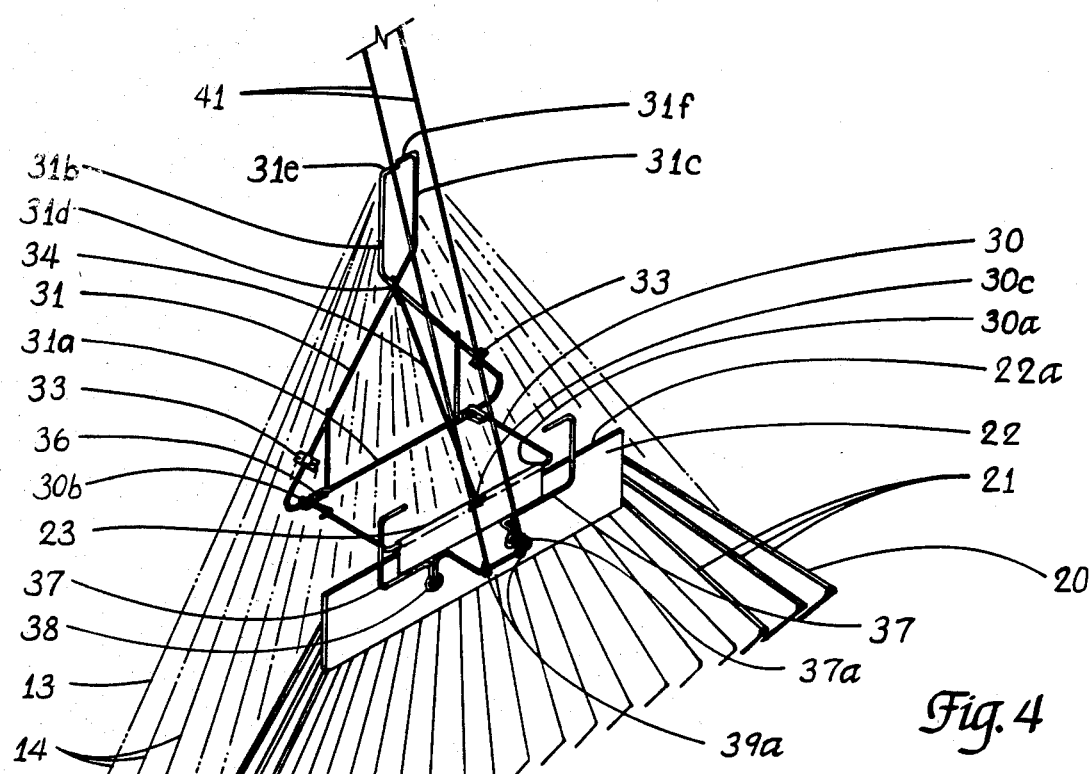
FIG. 4 is an isometric view of the device in the position of FIG. 1.

Referring now to the drawings, in which identical or corresponding parts are indicated by the same reference character throughout the several views, and more particularly to FIGS. 1, 2 and 3, whereon the grasping apparatus is designated generally at 10, and is shown installed upon a conventional rake 11 having a handle 12 and head 13.

Grasping apparatus 10 is comprised of a grasping head 20 pivotally attached via a pivoting link 30 to rake head 13. Grasping head 20 is operated by a pivotal lever 40 attached to rake handle 12.

Figure 5:
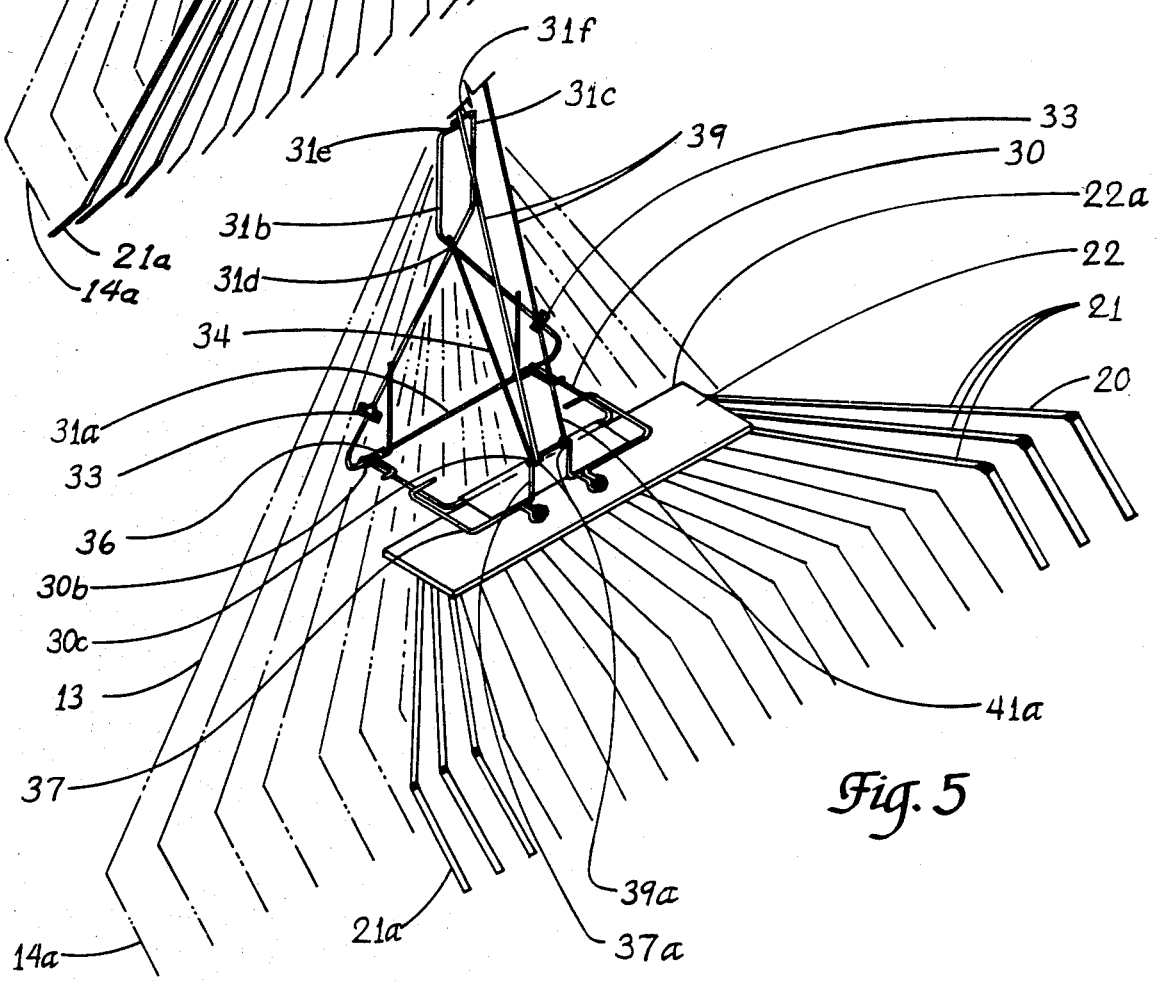
FIG. 5 is an isometric view of the device in the position of FIG. 2.

Referring now to FIGS. 4 and 5, grasping head 20 has a size and shape approximately equal to the lower half of rake head 13, and is mounted opposing rake head 13. The end portions 14a of rake head tines 14 and end portions 21a of grasping head tines 21 are bent inwards towards each other such that when rake head 14 is parallel to grasping head 20 the ends of tines 14a and 21a will touch, thus forming the jaws of a clamp. Tines 21 of grasping head 20 are affixed in the proper spaced-apart relationship on a rectangular plate 22, in a manner well known in the art.

Plate 22 lies in the same general plane as tines 21, with one edge 22a thereof projecting beyond the affixed ends of tines 21. A sleeve 23 is affixed along projecting edge 22a of plate 22, through which the base 30a of U-shaped link 30 is inserted and adapted for pivotal movement. Thus, grasping head 20 will pivot about base 30a of link 30 within sleeve 23.

Each free end of link 30 has a loop 30b which is looped around the side 31a, which is parallel to base 30a, of triangular frame 31. Thus, base 30a of link 30 will pivot about side 31a of frame 31 and remain generally parallel thereto. Triangular frame 31 is formed of a rod bent to a generally triangular shape, but having extensions 31b and 31c which cross to form the apex 31d of the triangle and are then bent to parallel each other. The upper ends 31e and 31f of extensions 31b and 31c are bent inwardly at 90 degrees for insertion into a housing 32 (shown in FIG. 2) which connects rake head 13 to handle 11 in a conventional manner.

Housing 32 is a sleeve fitted to handle 12, and the upper ends of tines 14 are affixed to its outer surface. Upper ends 31e and 31f of extensions 31b and 31c, respectively, form a surface which will abut the end of handle 11 within a portion of housing 32 (See FIG. 2) which extends beyond the end of handle 11.

Base member 31 is removably attachable to any conventional rake by inserting extensions 31b and 31c within the rake's housing 32 as described above, and the fastening base member 31 to rake head 13 using clip and bolt combinations 33 (Shown in FIG. 4), which are well known in the art. The bolts of the clip and bolt combinations 33, may be inserted between a tines 14 of rake head 13, thereby avoiding any drilling of holes or other permanent changes to rake 11.

Still referring to FIGS. 4 and 5, a flexible cable 34 is affixed at one end to the apex 31d of triangular frame 31, and at the other end to an intermediate point 30c on base 30a of link 30. Cable 34 is long enough to restrict link 30 from pivoting beyond a position substantially perpendicular to handle 11. A coil spring 36 is interposed upon side 31a of frame 31 adjacent each end of link 30. One end of each spring 36 is extended and bent to contact link 30 and the other end is extended to contact an adjacent side of frame 31 such that springs 36 will be further coiled by the pivotal movement of link 30 towards frame 31. It can therefore be seen that the bias of springs 36 will be limited by cable 34 such that link 30 may pivot only between a position adjacent the upper portion of rake head 13 and a position generally perpendicular to rake head 13.

A generally U-shaped rigid wire 37 is affixed flush to the face of plate 22 with the free ends projecting over edge 22a of plate 22. Wire 37 may be fastened to plate 22 using nuts and bolts 38 tightened through loops in wire 37, or by other methods well known in the art. The ends of wire 37 are bent inwardly so as to contact the sides of link 30 when grasping head 20 is pivoted upwardly on sleeve 23. Thus, the ends of wire 37 will act as a stop when grasping head 20 is pivoted to a position generally parallel to link 30, as seen in FIGS. 2, 3, and 5. An inverted U-shaped intermediate portion 37a of wire 37 is bent so as to project perpendicularly from the face of plate 22. Two rods 39 each have a looped end 39a connected to the inverted portion 37a of wire 37, and extend upwards to lever 40 on handle 12 of rake 11 (See FIGS. 1, 2, and 3).

Referring now to FIGS. 1–3, lever 40 is generally cylindrically shaped and is pivotally affixed between the legs of a U-bracket 41 which is affixed to a sleeve 42 secured to handle 12. A pin 43 through the diameter of lever 40 is journaled to the sides of U-bracket 41 in a manner well known in the art, to form the pivotal connection.

The free ends 39b of rods 39 are bent inwards so that they are axial, and then inserted into opposing ends of a diametric aperature 44 proximal the free end of lever 40. Thus, as lever 40 is pivoted about pin 43, ends 39b of rods 39 will pivot within aperture 44 in lever 40. Rods 39 extend from lever 40 to U-shaped portion 37a of wire 37 on either side of handle 12. Having two rods 39 prevents the uneven effect which would be produced by a single rod 39 on only one side of handle 12.

Since U-shaped portion 37a is always on the opposing side of handle 12, with respect to the position of pin 43, as aperture 44 on lever 40 is shifted towards handle 12 beyond a position where aperture 44, pin 43 and looped ends 39a of rods 39 are aligned, the bias of springs 36 will lock lever 40 in place against handle 12. Lever 40 will therefore hold grasping head 20 in the "unclamped" position (see FIG. 3) until released by the user.

Referring now to FIGS. 1, 2, 4 and 5, the grasping apparatus 10 may be attached to any conventional rake by sliding sleeve 42 onto the rake handle and securing it in place in conventional manner. Base member 31 is then inserted in housing 32 and also attached to rake head 13 as described hereinabove.

By shifting lever 40 down to a position generally parallel to handle 12, grasping head 20 is pivoted about link 30 until tines 21 contact tines 14 of rake head 13. Link 30 serves to hold the pivotal end of grasping head 20 away from rake head 13, thus enlarging the capacity of the grasping apparatus 10. Link 30 is held in a position perpendicular to rake 13 by the opposing forces of springs 36 and cable 34 (See FIGS. 1, 2 and 4), as described above.

To unclamp the material within the grasping apparatus 10, lever 40 is shifted upwards against the bias of spring 36, causing grasping head 20 to pivot about link 30. If it is desired to use rake 11 in a conventional manner, grasping head 20 may be locked into a position nearly flush with handle 12 (as shown in FIG. 3). As lever 40 is shifted upwards grasping head 20 will be stopped from pivoting about link 30 by the ends of wire 37. Continuing to shift lever 40 upwards will overcome the bias of springs 36 and grasping head 20 will pivot with link 30 about triangular frame 31. Thus, rake 11 can be used in a conventional manner without having to hold lever 40 in the "unclamped" position.

It will be readily understood that the particular disposition or arrangement or nature of the elements of the invention are not of the essence of the invention, and that many variations, substitutions, and modifications may be made, in departure from the particular construction and characterization in the drawings and foregoing description, without departing from the true spirit of the invention. It is therefore to be understood that the invention should be limited only by the breadth and scope of the appended claims.

I claim:

1. A rake with grasping apparatus, comprising:
   a rake having a handle and a head with tines;
   a link pivotally connected at one end to the rake above the free ends of the tines and pivotally connected at the other end to a grasping head at the edge thereof distal its free end, the free end of said grasping head being oppositely disposed to the free ends of the rake tines, whereby said grasping head and said rake head form the jaws of an operable clamp;
   means for limiting the pivotal movement of said link between a position generally perpendicular to the rake and an upward position adjacent to the rake;
   means for limiting the pivotal movement of said grasping head between a position generally aligned with said link and a closed position with said rake head; and
   means attached to the rake handle for controlling the pivotal positions of said grasping head and said link.

2. The rake with grasping apparatus of claim 1, further comprising means for biasing said link toward the position generally perpendicular to the rake head.

3. The rake with grasping apparatus of claim 1, wherein said grasping head pivotal position controlling means comprises:
   a lever pivotally attached to said rake at a point above the pivotal attachment of said link; and
   a substantially rigid rod pivotally attached at one end to said lever proximal its free end, and pivotally attached at the other end to said grasping head at a point spaced away from the pivotal edge thereof.

4. The rake with grasping apparatus of claim 1, wherein said link position limiting means includes a flexible cable attached at one end to a point on said rake above the point of attachment of said link and at the other end to a point on said link spaced away from the point of attachment on said rake.

5. The rake with grasping apparatus of claim 1, wherein said grasping head position limiting means includes a rigid member affixed to said grasping head and projecting outward generally within the plane of said grasping head such that the the rigid member will contact said link on its face, spaced away from said grasping head, whereby said grasping head will be restrained against pivoting beyond a position generally aligned with said link as it moves away from said rake head.

6. The rake with grasping apparatus of claim 3, wherein said lever is disposed on said rake handle on the side opposing said grasping head.

7. The rake with grasping apparatus of claim 2, wherein said grasping head pivotal position controlling means comprises:
   a lever pivotally attached to said rake at a point above the pivotal attachment of said link; and
   a substantially rigid rod pivotally attached at one end to said lever proximal its free end, and pivotally attached at the other end to said grasping head at a point spaced away from the pivotal edge thereof.

8. The rake with grasping apparatus of claim 2, wherein said link position limiting means includes a flexible cable attached at one end to a point on said rake above the point of attachment of said link and at the other end to a point on said link spaced away from the point of attachment on said rake.

9. The rake with grasping apparatus of claim 2, wherein said grasping head position limiting means includes a rigid member affixed to said grasping head and projecting outward generally within the plane of said grasping head such that the the rigid member will contact said link on its face, spaced away from said grasping head, whereby said grasping head will be restrained against pivoting beyond a position generally aligned with said link as it moves away from said rake head.

10. The rake with grasping apparatus of claim 2, wherein said lever is disposed on said rake handle on the side opposing said grasping head.

11. The rake with grasping apparatus of claim 7, wherein said link position limiting means includes a flexible cable attached at one end to a point on said rake above the point of attachment of said link and at the other end to a point on said link spaced away from the point of attachment on said rake.

12. The rake with grasping apparatus of claim 7, wherein said grasping head position limiting means includes a rigid member affixed to said grasping head and projecting outward generally within the plane of said grasping head such that the the rigid member will contact said link on its face, spaced away from said grasping head, whereby said grasping head will be restrained against pivoting beyond a position generally aligned with said link as it moves away from said rake head.

13. The rake with grasping apparatus of claim 11, wherein said grasping head position limiting means includes a rigid member affixed to said grasping head and projecting outward generally within the plane of said grasping head such that the the rigid member will contact said link on its face, spaced away from said grasping head, whereby said grasping head will be restrained against pivoting beyond a position generally aligned with said link as it moves away from said rake head.

14. The rake with grasping apparatus of claim 13, wherein said lever is disposed on said rake handle on the side opposing said grasping head.

15. A grasping apparatus for attachment to a rake, comprising:
   a link for pivotal attachment at one end to a conventional rake above the free ends of the tines thereof and pivotally connected at the other end to a grasping head at the edge thereof distal its free end, the free end of said grasping head being oppositely disposed to the free ends of the rake tines, whereby said grasping head and said rake head form the jaws of an operable clamp;
   means for limiting the pivotal movement of said link between a position generally perpendicular to the rake and an upward position adjacent to the rake;
   means for limiting the pivotal movement of said grasping head between a position generally aligned with said link and a closed position with said rake head; and
   controlling means for attachment to the handle of the rake, said controlling means controlling the pivotal positions of said grasping head and said link.

16. The grasping apparatus of claim 15, further comprising means for biasing said link toward the position generally perpendicular to the rake head.

17. The grasping apparatus of claim 16, wherein said grasping head pivotal position controlling means comprises:
   a lever pivotally attached to said rake at a point above the pivotal attachment of said link; and
   a substantially rigid rod pivotally attached at one end to said lever proximal its free end, and pivotally attached at the other end to said grasping head at a point spaced away from the pivotal edge thereof.

18. The grasping apparatus of claim 17, wherein said link position limiting means includes a flexible cable attached at one end to a point on said rake above the point of attachment of said link and at the other end to a point on said link spaced away from the point of attachment on said rake.

19. The rake with grasping apparatus of claim 18, wherein said grasping head position limiting means includes a rigid member affixed to said grasping head and projecting outward generally within the plane of said grasping head such that the the rigid member will contact said link on its face, spaced away from said grasping head, whereby said grasping head will be restrained against pivoting beyond a position generally aligned with said link as it moves away from said rake head.

20. The grasping apparatus of claim 19, wherein said lever is disposed on said rake handle on the side opposing said grasping head.

* * * * *